(12) United States Patent
Hong et al.

(10) Patent No.: US 11,588,929 B2
(45) Date of Patent: Feb. 21, 2023

(54) OPTICAL ELEMENT, MOBILE PHONE COVER PLATE AND MOLD FOR MANUFACTURING OPTICAL ELEMENT

(71) Applicant: Shine Optoelectronics (Kunshan) Co., Ltd., Kunshan (CN)

(72) Inventors: Shen Hong, Kunshan (CN); Yulong Gao, Kunshan (CN); Hongwei Kang, Kunshan (CN); Su Shen, Kunshan (CN)

(73) Assignee: Shine Optoelectronics (Kunshan) Co., Ltd., Kunshan (CN)

( * ) Notice: Subject to any disclaimer, the term of this patent is extended or adjusted under 35 U.S.C. 154(b) by 5 days.

(21) Appl. No.: 16/685,962

(22) Filed: Nov. 15, 2019

(65) Prior Publication Data

US 2020/0084311 A1    Mar. 12, 2020

Related U.S. Application Data

(63) Continuation of application No. PCT/CN2018/086794, filed on May 15, 2018.

(30) Foreign Application Priority Data

May 16, 2017 (CN) .......................... 201710343681.5

(51) Int. Cl.
*H04M 1/02* (2006.01)
*G02B 3/00* (2006.01)
*G02B 3/06* (2006.01)

(52) U.S. Cl.
CPC ........ *H04M 1/0283* (2013.01); *G02B 3/0043* (2013.01); *G02B 3/06* (2013.01)

(58) Field of Classification Search
CPC ..... H04M 1/0283; G02B 3/0043; G02B 3/06; G02B 3/0056; G02B 3/00; B29C 33/00
See application file for complete search history.

(56) References Cited

U.S. PATENT DOCUMENTS 3,798,388 A * 3/1974 Dickopp .................. G11B 7/24
369/275.4
5,493,427 A * 2/1996 Nomura ............. G02B 27/0093
349/5

(Continued)

FOREIGN PATENT DOCUMENTS

CN         101249773 A        8/2008
CN         101346244 B  *     6/2011   ............. B42D 25/00

(Continued)

OTHER PUBLICATIONS

Chinese Search Repod dated Jun. 14, 2019, for Chinese Patent Application No. 201710343681.5 (English translation included).

(Continued)

*Primary Examiner* — James Wu
*Assistant Examiner* — Christopher L Augustin
(74) *Attorney, Agent, or Firm* — Hamilton, Brook, Smith & Reynolds, P.C.

(57) ABSTRACT

An optical element (100c), a mobile phone cover plate covering the optical element (100c) and a mold for manufacturing the optical element (100c). The optical element (100c) comprises: plural texture patterns (1c), at least one of the plural texture patterns (1c) having a concave structure or a convex structure, the at least one texture pattern (1c) containing at least one sub-texture pattern unit (11c, 12c), wherein the at least one texture pattern (1c) is of a curved shape. Hence, the texture patterns may produce a light shadow effect, which have a good visual effect, and when they are applied in the field of decoration, they are able to enhance a decoration effect, and make the decoration rich in visual senses and pictures vivid.

6 Claims, 8 Drawing Sheets

(56) References Cited

U.S. PATENT DOCUMENTS

| | | | | |
|---|---|---|---|---|
| 9,238,309 B2* | 1/2016 | King | ................... | B29C 33/3857 |
| 2003/0058555 A1* | 3/2003 | Takino | ................... | G02B 7/182 |
| | | | | 359/850 |
| 2004/0189897 A1* | 9/2004 | Ohhira | ................... | G02B 5/09 |
| | | | | 349/113 |
| 2004/0241588 A1* | 12/2004 | Ning | ................... | G03F 7/168 |
| | | | | 430/321 |
| 2008/0206495 A1* | 8/2008 | Korechika | ............... | G02B 5/09 |
| | | | | 428/30 |
| 2010/0118404 A1* | 5/2010 | Endoh | ................... | G02B 1/118 |
| | | | | 359/569 |
| 2010/0183814 A1* | 7/2010 | Rios | ................... | A43B 13/04 |
| | | | | 427/387 |
| 2012/0182615 A1* | 7/2012 | Vasylyev | ............... | G02B 3/005 |
| | | | | 359/530 |
| 2013/0059117 A1 | 3/2013 | Hill | | |
| 2016/0320531 A1* | 11/2016 | Kamali | ............... | G02B 5/0226 |
| 2017/0200881 A1* | 7/2017 | Gdala | ................... | H01L 41/09 |
| 2018/0001691 A1* | 1/2018 | Harada | ................... | B42D 25/29 |

FOREIGN PATENT DOCUMENTS

| | | | | | |
|---|---|---|---|---|---|
| CN | 102279425 | A | | 12/2011 | |
| CN | 102314096 | A | * | 1/2012 | ......... G02B 27/0911 |
| CN | 102590905 | A | | 7/2012 | |
| CN | 103068192 | A | | 4/2013 | |
| CN | 105015215 | A | | 11/2015 | |
| CN | 105319628 | A | | 2/2016 | |
| CN | 105388543 | A | | 3/2016 | |
| CN | 205344004 | U | | 6/2016 | |
| CN | 105899024 | A | | 8/2016 | |
| CN | 206100097 | U | | 4/2017 | |
| JP | 2014182160 | A | * | 9/2014 | |
| KR | 2011004654 | A | * | 1/2011 | ............. A45C 11/00 |

OTHER PUBLICATIONS

International Search Report issued in counterpart Chinese Application No. PCT/CN2018/086794, dated May 15, 2018 (English translation included).

\* cited by examiner

OPTICAL ELEMENT, MOBILE PHONE COVER PLATE AND MOLD FOR MANUFACTURING OPTICAL ELEMENT

CROSS REFERENCE TO RELATED APPLICATION

This application is a continuation of International Application No. PCT/CN2018/086794, which designates the United States and was filed on May 15, 2018, published in Chinese, which claims priority to Chinese Application No. 201710343681.5, entitled "Optical Component, Mobile Phone Cover Plate, and Mold for Manufacturing Optical Component," filed May 16, 2017. The entire teachings of the above applications are incorporated herein by reference.

TECHNICAL FIELD

This disclosure relates to the field of optics, and in particular to an optical element, mobile phone cover plate and mold for manufacturing optical element.

BACKGROUND ART

At present, the consumer electronics industry is developing faster and faster, and various manufacturers are constantly seeking technological innovation and functional innovation to cater to the development trends of environmental protection, energy conservation and differentiation. The design of consumer electronics has not only been limited to the perfection of functions, many designers have turned their attention to the design of the appearance of consumer electronics. Taking a mobile phone as an example, a mobile phone cover plate not only functions to protect the parts inside the mobile phone, but also serves to beautify and decorate mobile phone. An excellent design of a mobile phone cover plate may not only increase the value of the mobile phone, but also improve user experiences. It increases a range of choice of shapes of mobile phones, and makes mobile phones more popular to users. However, the current decorative design of the mobile phone cover plates is focused on replacement of materials (such as glass, metal, plastic) or the replacement of a single color of a color layer, resulting in that visual senses are unitary and pictures are not sufficiently vivid, so that a decorative effect is not good.

The same defect also exists in design of appearance in other field, such as household appliances, furnitures, automobiles, and cosmetics packaging, etc.

SUMMARY OF THE INVENTION

Due to the above reasons, there is a need to provide an optical element, which has a relatively good visual effect.

A technical solution of this disclosure is as follows.

A optical element, including plural texture patterns, at least one type of texture patterns of plural texture patterns having concave structures or convex structures, and the at least one type of texture patterns containing at least one type of sub-texture pattern units, wherein the at least one type of texture patterns are of curved shapes.

In an embodiment, it includes one type of texture patterns, each of the texture patterns including a sub-texture pattern unit.

In an embodiment, it includes one type of texture patterns, each of the texture pattern including two or more consecutively disposed sub-texture pattern units of one type of sub-texture pattern units.

In an embodiment, it includes two or more types of texture patterns, each type of the texture patterns including one or more types of sub-texture pattern units, and each of the texture patterns including one or more sub-texture pattern units.

In an embodiment, each type of the texture patterns include two or more types of sub-texture pattern units, the two or more types of sub-texture pattern units being alternately, regularly, or randomly connected and disposed in a texture pattern.

In an embodiment, it includes two or more types of texture patterns disposed in a column, in the same column, the two or more types of texture patterns being alternately, regularly or randomly disposed.

In an embodiment, it includes two or more types of texture patterns, the two or more types of texture patterns having at least one identical sub-texture pattern unit.

In an embodiment, one of the texture patterns has two or more identical or different sub-texture pattern units, the two or more identical or different sub-texture pattern units being disposed consecutively.

In an embodiment, the sub-texture pattern unit is a curved cylindrical lens.

In an embodiment, the curved cylindrical lens is of a sinusoidal curve, a cosine curve, or an irregular curve.

In an embodiment, at least one parameter of amplitudes, curvatures, widths, angles, radians, widths, and lengths, of curves of two different types of sub-texture pattern units is different.

In an embodiment, the curved cylindrical lens includes a front end point and a rear end point at both ends of a curve, a rear end of a curved cylindrical lens of two curved cylindrical lenses of neighboring two sub-texture pattern units being smoothly connected to a front end of the other curved cylindrical lens.

In an embodiment, the sub-texture pattern unit is a plurality of small short lines arranged in curves.

In an embodiment, the small short lines are a linear cylindrical mirror or a curved cylindrical lens with a length greater than or equal to 10 μm.

In an embodiment, small short lines in the same sub-texture pattern unit are located on a curve, or central points of small short lines in the same sub-texture pattern unit are located on a curve.

In an embodiment, at least a part of the small short lines are offset from the horizontal direction, or at least a part of the small short lines are offset from their respective central points.

In an embodiment, offset angles of the small short lines in the same sub-texture pattern unit change in an ascending order or a descending order.

In an embodiment, at least one parameter of lengths, widths, cross-sectional shapes, reliefs, numbers, arranged curves and offset angles of small short lines in the two different types of sub-texture pattern units are different.

In an embodiment, the optical element further includes a carrier layer, an optical layer disposed at a side of the carrier layer, a substrate layer disposed at an opposite side of the carrier layer, a reflective layer covering the optical layer and a colored layer covering the reflective layer, the optical layer including the plural texture patterns.

In an embodiment, the sub-texture pattern unit is a curved cylindrical lens, a linear cylindrical mirror, or a plurality of small short lines arranged in curves, one type of texture patterns of the optical element include a curved cylindrical lens, and another type of texture patterns include a linear cylindrical mirror; or one type of texture patterns of the optical element include a plurality of small short lines arranged in curves, and another type of texture patterns include a linear cylindrical mirror; or one type of texture patterns of the optical element include a curved cylindrical lens, another type of texture patterns include a linear cylindrical mirror, and a further type of texture patterns include a plurality of small short lines arranged in curves.

This application further discloses a mobile phone cover plate, including the above-described optical element.

This application further discloses a mold for manufacturing the above-described optical element, the mold including plural texture patterns, at least one type of texture patterns of the plural texture patterns having concave structures or convex structures, the at least one type of texture patterns containing at least one type of sub-texture pattern units, wherein the at least one type of texture patterns are of curved shapes.

An advantage of this disclosure exists in that the texture patterns are of concave structures or convex structures, and the texture patterns are of curved shapes and contain at least one type of sub-texture pattern units, so that the texture patterns may produce a light shadow effect, which have a good visual effect, and when they are applied in the field of decoration, they are able to enhance a decoration effect, and make the decoration rich in visual senses and pictures vivid.

DETAILED DESCRIPTION OF THE INVENTION

Figure 1:
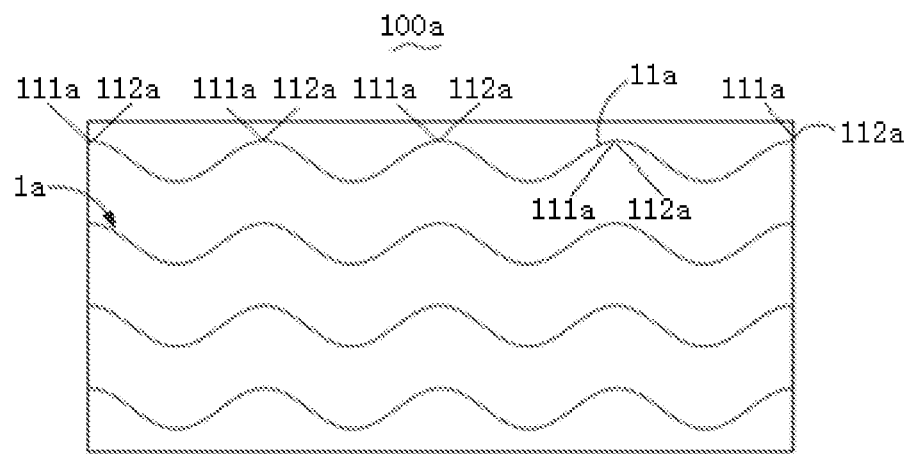
FIG. 1 is a schematic diagram of the optical element of this disclosure.

For this disclosure to be understood, this disclosure shall be fully described below with reference to the accompanying drawings. Better embodiments of this disclosure are given in the accompanying drawings; however, this disclosure may be carried out in various ways, which are not limited to those described below. Rather, these embodiments are provided so that the contents disclosed in this disclosure are understood more thoroughly and completely.

All technical and scientific terms used herein have the same meanings as commonly understood by those skilled in the art to which this disclosure pertains, unless otherwise defined. The terminology used in the description of this disclosure is for the purpose of describing particular embodiments and is not intended to limit this disclosure. The term "and/or" as used herein includes any and all combinations of one or more of the associated listed items.

This application discloses an optical element, including plural texture patterns, at least one type of texture patterns of the plural texture patterns having concave structures or convex structures; the at least one type of texture patterns containing at least one type of sub-texture pattern units, wherein the at least one type of texture patterns are of curved shapes. The texture patterns are of concave structures or convex structures, and the texture patterns are of curved shapes and contain at least one type of sub-texture pattern units, so that the texture patterns may produce a light shadow effect, which have a good visual effect, and when they are applied in the field of decoration, they are able to enhance a decoration effect, and make the decoration rich in visual senses and pictures vivid.

Preferably, the optical element includes one type of texture patterns, each of the texture patterns including a sub-texture pattern unit, and plural texture patterns are arrange.

Preferably, the optical element includes one type of texture patterns, each of the texture pattern including two or more consecutively disposed sub-texture pattern units of one type of sub-texture pattern units. For example, the optical element includes one type of texture patterns, this type of texture patterns being multiple and being arrange in a column, each texture pattern including two sub-texture pattern units, and two sub-texture pattern units of the same texture pattern being consecutively disposed.

Preferably, the optical element includes two or more types of texture patterns, each type of the texture patterns including one or more types of sub-texture pattern units, and each of the texture patterns including one or more sub-texture pattern units. For example, the optical element includes two types of texture patterns, each type of the texture patterns including one type of sub-texture pattern units, and each of the texture patterns including one sub-texture pattern unit.

Preferably, each type of the texture patterns include two or more types of sub-texture pattern units, the two or more types of sub-texture pattern units being alternately, regularly, or randomly connected and disposed in a texture pattern. For example, one type of the texture patterns include two types of texture pattern units, the two types of texture pattern units being alternately disposed two by two.

Preferably, the optical element includes two or more types of texture patterns disposed in a column, in the same column, the two or more types of texture patterns being alternately, regularly or randomly disposed. For example, the optical element includes two types of texture patterns disposed in a column, the two types of texture patterns being alternately disposed in the same column.

Preferably, the optical element includes two or more types of texture patterns, the two or more types of texture patterns having at least one identical sub-texture pattern unit. For example, the optical element includes two types of texture patterns, one type of texture patterns including a first sub-texture pattern unit and a second sub-texture pattern unit, and another type of texture patterns including the first sub-texture pattern unit and a third sub-texture pattern unit.

Preferably, one of the texture patterns has two or more identical or different sub-texture pattern units, the two or more identical or different sub-texture pattern units being disposed consecutively.

Preferably, the sub-texture pattern unit is a curved cylindrical lens. The curved cylindrical lens is of a sinusoidal curve, a cosine curve, or other irregular curves. At least one parameter of amplitudes, curvatures, widths, angles, radians, widths, and lengths, of curves of two types of different sub-texture pattern units are different. The curved cylindrical lens is of a sinusoidal curve, or a cosine curve, hence, a sinusoidal curve or a cosine curve of 2π, 1π, ½ or ¼ may become a sub-texture pattern unit. Units of neighboring cycle are disposed consecutively. For example, the curved cylindrical lens includes a front end point and a rear end point at both ends of a curve, a rear end of a curved cylindrical lens of two curved cylindrical lenses of neighboring two sub-texture pattern units being smoothly connected to a front end of the other curved cylindrical lens of the two curved cylindrical lenses. The being smoothly connected refers that curvatures of two curves at an intersection are identical and there exists no steep curve.

Preferably, the sub-texture pattern unit is plural small short lines arranged in curves. The small short line is a linear cylindrical mirror or a curved cylindrical lens with a length greater than or equal to 10 μm and less than or equal to 300 μm. For example, a length the small short lines is 80 μm, 100 μm, or 120 etc. Small short lines in the same sub-texture pattern unit are located on a curve, and preferably, central points of small short lines in the same sub-texture pattern unit (for example, the cylindrical mirror is a linear cylindrical mirror of a convex structure, and its cross section is semi-circular, then a central point of the small short lines is an intersection of a middle point in a length direction of the linear cylindrical mirror and the center of the cross section) are located on a curve. At least a part of the small short lines are offset from the horizontal direction, and preferable, at least a part of the small short lines are offset from their respective central points (which refers to that the small short lines are rotatable around respective central points). Preferably, offset angles of the small short lines (angles by which the small short lines are rotatable counterclockwise from a horizontal position by taking the central points as centers) in the same sub-texture pattern unit change in an ascending order or a descending order. For example, the offset angles of the small short lines change from 0 degree to 180 degrees or change from 180 degrees to 0 degree. Preferably, offset angles of the small short lines in the same sub-texture pattern unit are identical, or differences between offset angles of neighboring small short lines in the same sub-texture pattern unit are identical. Preferably, at least one parameter of lengths (such as lengths of linear cylindrical mirrors), widths (such as widths of linear cylindrical mirrors), cross-sectional shapes (such as cross-sectional shapes of linear cylindrical mirrors, such as semi-circular shapes, and rectangular shapes, etc.), reliefs (for example, linear cylindrical mirrors are of convex structures or concave structures), numbers (such as the number of linear cylindrical mirrors in the same unit), arranged curves (curves of distribution of central points of the small short lines) and offset angles (angles by which cylindrical mirrors are rotatable around respective central points) of small short lines in different sub-texture pattern units is different.

Preferably, the sub-texture pattern unit is a curved cylindrical lens, a linear cylindrical mirror, or plural small short lines arranged in curves. One type of texture patterns of the optical element include a curved cylindrical lens, and another type of texture patterns include a linear cylindrical mirror; or one type of texture patterns of the optical element include plural small short lines arranged in curves, and another type of texture patterns include a linear cylindrical mirror; or one type of texture patterns of the optical element include a curved cylindrical lens, another type of texture patterns include a linear cylindrical mirror, and a further type of texture patterns include plural small short lines arranged in curves.

Preferably, one type of the texture patterns are disposed in a column, and the extending directions of the columns may be the same or different. Such as two type texture patterns, one type of the texture pattern is arranged in columns in the horizontal direction, and the other type of texture pattern is arranged in a vertical direction.

Preferably, the texture patterns are disposed in a column, and are disposed at intervals, alternately, regularly, or randomly.

The optical element further includes a carrier layer, an optical layer disposed at a side of the carrier layer, a substrate layer disposed at an opposite side of the carrier layer, a reflective layer covering the optical layer and a colored layer covering the reflective layer, the optical layer including the plural texture patterns.

This application further discloses a mobile phone cover plate, including the above-described optical element.

Referring to FIG. 1, an optical element 100a is disclosed, which includes plural texture patterns. There is a texture pattern 1a in plural texture patterns, which is of a convex structure. The texture pattern 1a includes a type of sub-texture pattern units 11a. The texture pattern is of a curved shape. The sub-texture pattern unit 11a is curved cylindrical lens which is of cosine curve. The texture pattern 1a includes four identical sub-texture pattern units 11a, i.e. four identical curved cylindrical lenses. A curved cylindrical lens includes a front end point 111a and a rear end point 112a. From an angle facing the picture, a rear end point 112a of a curved cylindrical lens located left in adjacent two curved cylindrical lenses is smoothly connected to a front end of a curved cylindrical lens located right. Each row is a texture pattern 1a, and the texture pattern 1a is a plurality of consecutively arranged sub-texture pattern units, and a plurality of rows is arranged in a column.

Figure 2:
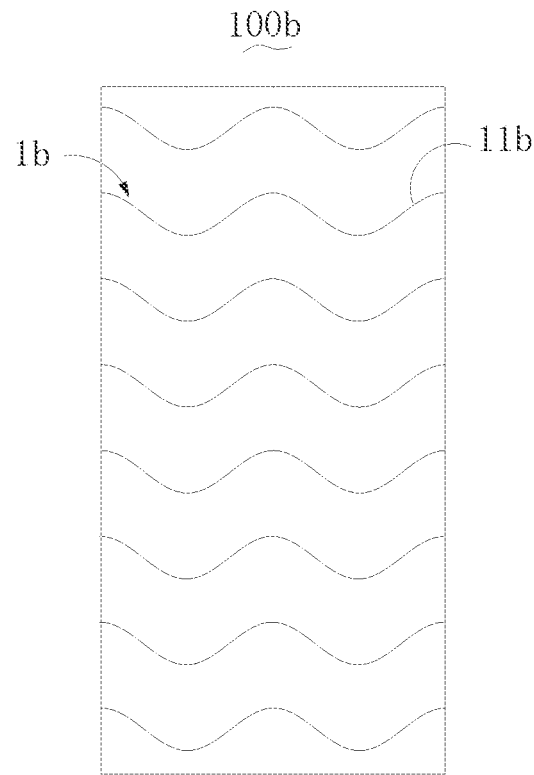
FIG. 2 is another schematic diagram of the optical element of this disclosure.

Referring to FIG. 2, an optical element 100b is different from an optical element 100a in that a texture pattern 1b includes one type of sub-texture pattern units 11b, the number of which being 2, and the two sub-texture pattern units 11b are smoothly connected to each other. A difference between a curve extension direction of a sub-texture pattern unit 11b and a curve extension direction of a sub-texture pattern unit 11a is 90 degrees, of course, this is relative speaking. The texture patterns 1b are also arranged in a column.

Figure 3:
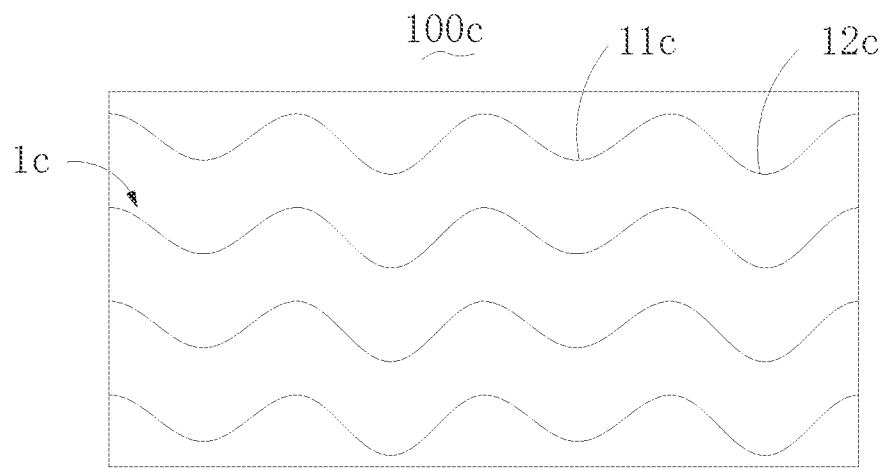
FIG. 3 is a further schematic diagram of the optical element of this disclosure.

Referring to FIG. 3, the optical element 100c includes a type of texture patterns 1c. The texture patterns 1c include two types of sub-texture pattern units: a first unit 11c and a second unit 12c. The first unit 11c is of a cosine curve, and the second unit 12c is of a cosine curve. An amplitude of the cosine curve of the second unit 12c is greater than an amplitude of the cosine curve of the first unit 11c. A texture pattern 1c includes two first units 11c and two second units 12c, and the first units 11c and the second units 12c are alternately disposed, or are regularly arranged one by one. Plural texture patterns 1c are arranged in a column.

Figure 4:
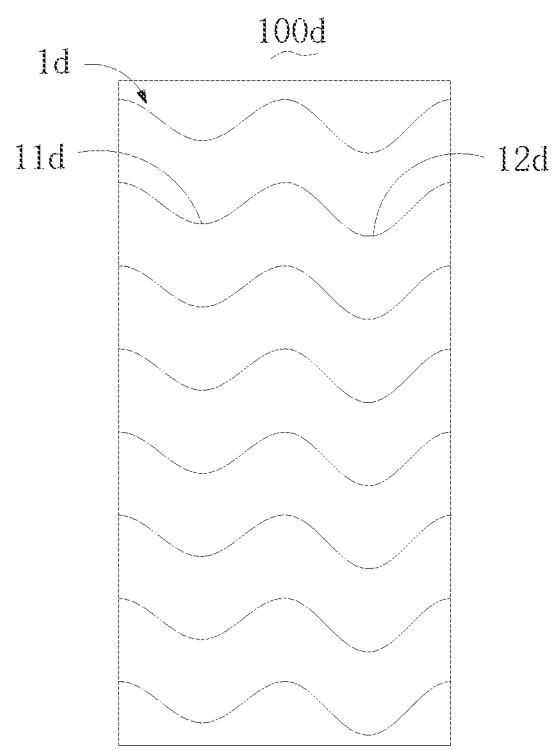
FIG. 4 is yet a further schematic diagram of the optical element of this disclosure.

Referring to FIG. 4, the optical element 100d is different from the optical element 100c in that one texture pattern 1d includes a first unit 11d and a second unit 12d. The first unit 11d and the second unit 12d are smoothly connected in a curve. A difference between an extension direction of the first unit 11d and an extension direction of the first unit 11c is 90 degrees, and a difference between an extension direction of the second unit 12*d* and an extension direction of the second unit 12*c* is 90 degrees. Plural texture patterns 1*d* are arranged in a column.

Figure 5:
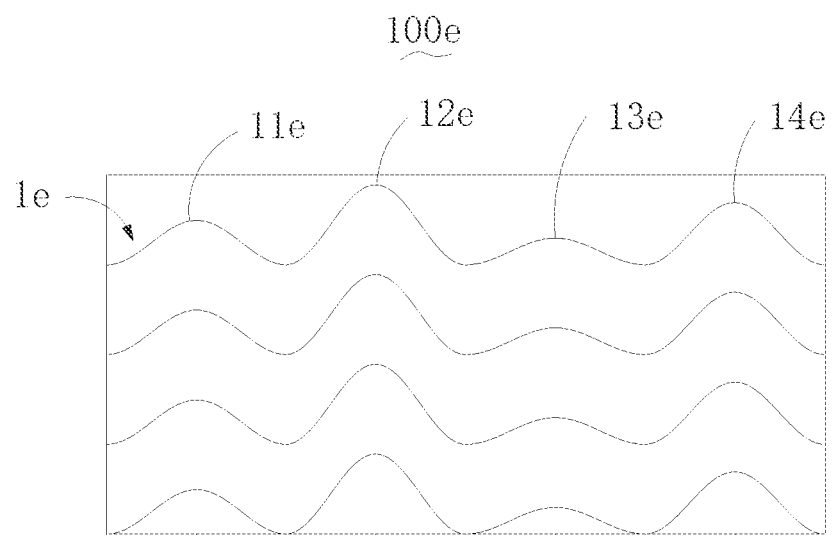
FIG. 5 is yet a further schematic diagram of the optical element of this disclosure.

Referring to FIG. 5, the optical element 100*e* includes a type of texture patterns 1*e*. The texture patterns 1*e* include four types of sub-texture pattern units: a first unit 11*e*, a second unit 12*e*, a third unit 13*e*, and a fourth unit 14*e*. The first unit 11*e* to the fourth unit 14*e* are all of curved cylindrical lenses, their curved shapes are all of sinusoidal curves, which are different from each other with respect to amplitudes. Wherein, the curve amplitude of the second unit 12*e* is greater than the curve amplitude of the fourth unit 14*e*, the curve amplitude of the fourth unit 14*e* is greater than the curve amplitude of the first unit 11*e*, the curve amplitude of the first 11*e* is greater than the curve amplitude of the third unit 13*e*. The texture pattern 1*c* includes four sub-texture pattern units, which are respectively a first unit 11*e* to a fourth unit 14*e* that are sequentially smoothly connected. Plural texture patterns 1*e* are arranged in a column.

Figure 6:
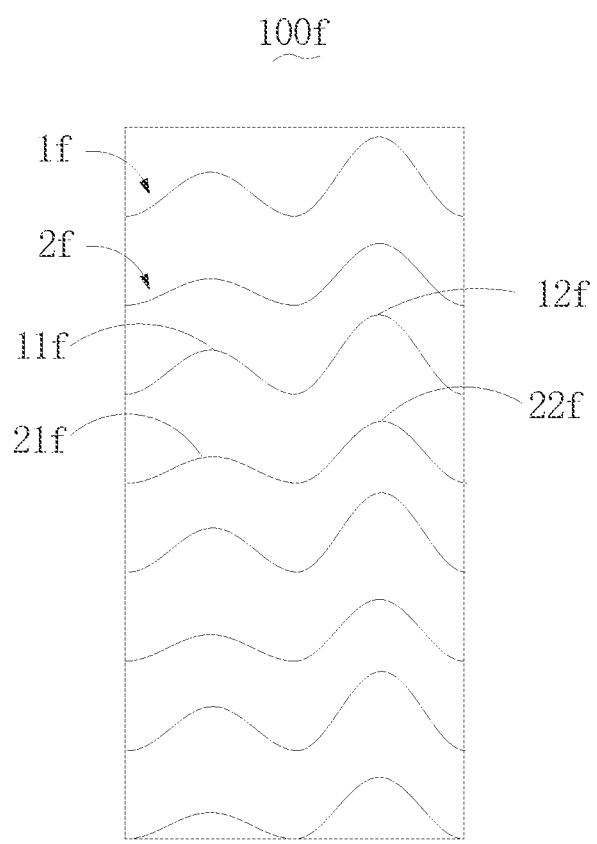
FIG. 6 is yet a further schematic diagram of the optical element of this disclosure.

Referring to FIG. 6, the optical element 100*f* includes two types texture patterns: first texture patterns if and second texture patterns 2*f*. The first texture patterns if include two sub-texture pattern units: a first unit 11*f* and a second unit 12*f*. The second texture patterns 2*f* include two sub-texture pattern units: a third unit 21*f* and a fourth unit 22*f*. The first unit 11*f*, the second unit 12*f*, the third unit 21*f* and the fourth unit 22*f* are all of curved cylindrical lenses, their curved shapes are all of sinusoidal curves, which are different from each other with respect to amplitudes. Wherein, the curve amplitude of the second unit 12*f* is greater than the curve amplitude of the fourth unit 22*f*, the curve amplitude of the fourth unit 22*f* is greater than the curve amplitude of the first unit 11*f*, the curve amplitude of the first unit 11*f* is greater than the curve amplitude of the third unit 21*f*. A first texture pattern if includes a first unit 11*f* and a second unit 12*f* that are connected in a line. A second texture pattern 2*f* includes a third unit 21*f* and a fourth unit 22*f* that are connected in a line. A plurality of first texture patterns 1*f* and a plurality of second texture patterns 2*f* are arranged in a column. The first texture patterns 1*f* and the second texture patterns 2*f* are arranged alternately.

Figure 7:
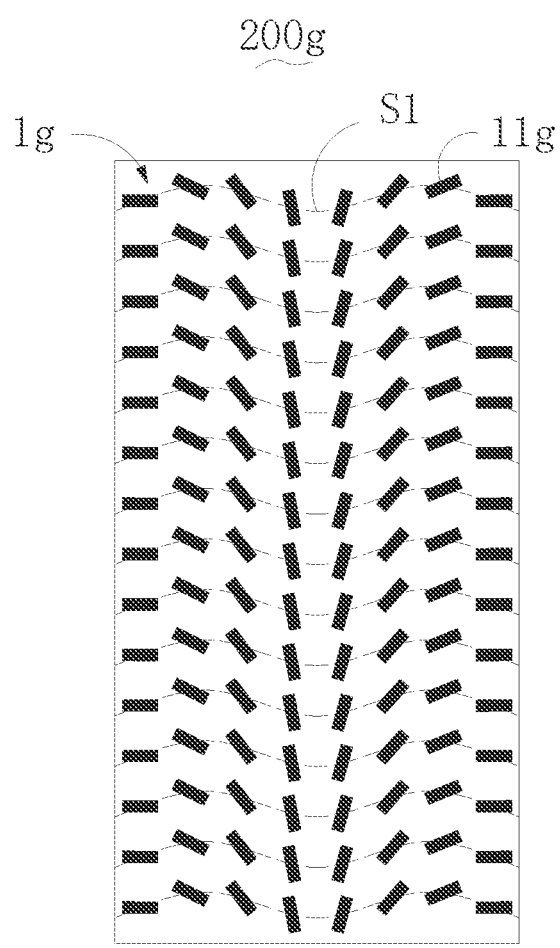
FIG. 7 is yet a further schematic diagram of the optical element of this disclosure.

Referring to FIG. 7, the optical element 200*g* includes a texture pattern 1*g*. The texture pattern 1*g* includes a sub-texture pattern unit 11*g*. The sub-texture pattern unit 1*g* is a plurality of small short lines arranged in accordance with a first curve S1 (which is predetermined and does not actually exist). The small short lines are a linear cylindrical mirror. Preferably, a length of the linear cylindrical mirror is greater than or equal to 50 μm, such as 80 μm, 100 μm, or 120 μm, etc. Center points of the the small short lines of the sub-texture pattern unit 1*g* are distributed along the first curve S1, and each small short line is offset from the respective center point, and an offset angle of the small short line is from 0 to 180 degrees. The texture pattern 1*g* is of a first curved shape, the first curve being of a sinusoidal curve with two peaks. The texture pattern 1*g* includes one sub-texture pattern unit 11*g*, and plural texture patterns 1*g* are arranged in a column.

Figure 8:
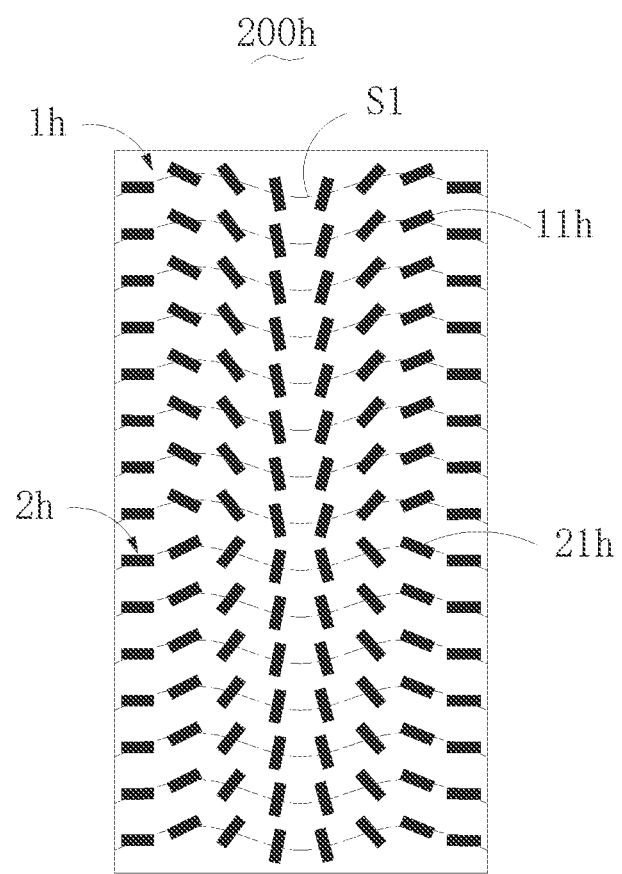
FIG. 8 is yet a further schematic diagram of the optical element of this disclosure.

Referring to FIG. 8, the optical element 200*h* includes two texture patterns: a first texture pattern 1*h* and a second texture pattern 2*h*. The first texture pattern 1*h* includes a sub-texture pattern unit: a first unit 11*h*. The first unit 11*h* is a plurality of small short lines arranged in accordance with a first curve S1 (which is predetermined and does not actually exist). The small short lines are a linear cylindrical mirror. Central points of small short lines of the first unit 11*h* are distributed along the virtual first curve S1, and the small short lines are offset from their respective central points, offset angles of the small short lines being from 0 to 180 degrees. The second texture pattern 2*h* includes a sub-texture pattern unit: a second unit 21*h*. The second unit 21*h* is a plurality of small short lines arranged in accordance with the first curve S1 (which is predetermined and does not actually exist). The small short lines are a linear cylindrical mirror. Central points of small short lines of the second unit 21*h* are distributed along the virtual first curve S1, and the small short lines are offset from their respective central points, offset angles of the small short lines being from 0 to 180 degrees. The first texture pattern 1*h* and the second texture pattern 2*h* are both of a first curved shape S1, but their sub-texture pattern units are different. The first texture pattern 1*h* a first unit 11*h*, and the second texture pattern 2*h* includes a second unit 21*h*. A plurality of first texture patterns 1*h* are arranged in a column, and a plurality of second texture pattern 2*h* are arranged in a column, and the two columns are arrange in a column. In other embodiments, the first texture patterns 1*h* and the second texture pattern 2*h* are alternately arranged in a column one by one or two by two, etc.

Figure 9:
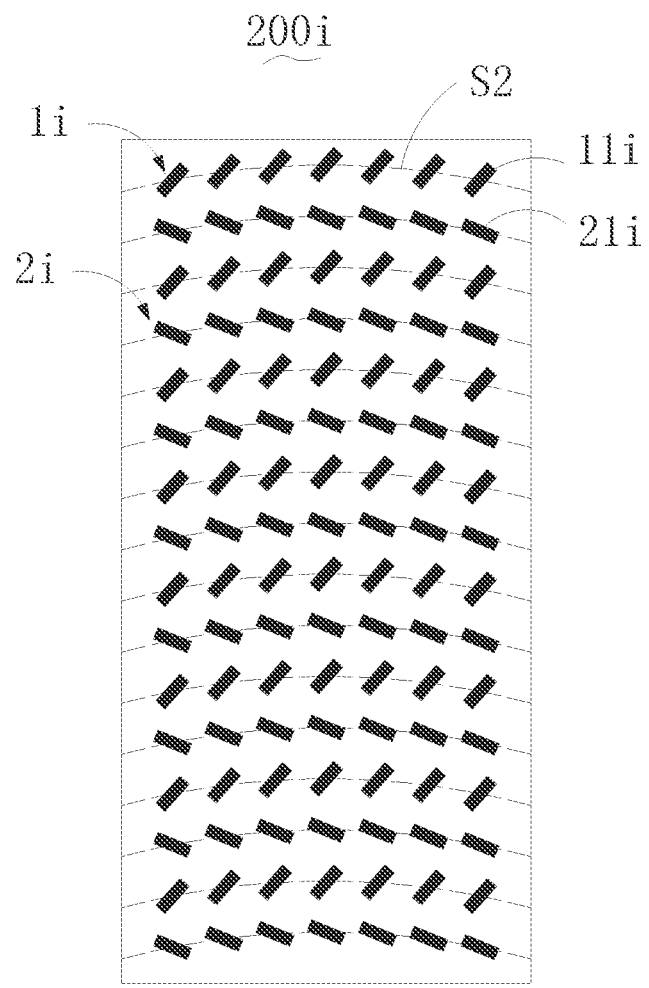
FIG. 9 is yet a further schematic diagram of the optical element of this disclosure.

Referring to FIG. 9, the optical element 200*i* includes two texture patterns: a first texture pattern 1*i* and a second texture pattern 2*i*. The first texture pattern 1*i* includes a sub-texture pattern unit: a first unit 11*i*. The first unit 11*i* is a plurality of small short lines arranged in accordance with the second curve S2 (which is predetermined and does not actually exist), and the small short lines are a linear cylindrical mirror. Central points of small short lines of the first unit 11*i* are distributed along the second curve S2, and the small short lines are offset from their respective central points, offset angles of the small short lines of the first unit 11*i* being identical, such as 60 degrees. The second texture pattern 2*h* includes a sub-texture pattern unit: a second unit 21*i*. The second unit 21*i* is a plurality of small short lines arranged in accordance with a second curve S2 (which is predetermined and does not actually exist), and the small short lines are a linear cylindrical mirror. Central points of the small short lines of the second unit 21*i* are distributed along the second curve S2, and the small short lines are offset from their respective central points, offset angles of the small short lines of the second unit 21*i* being identical, such as 150 degrees. The first texture pattern 1*i* and the second texture pattern 2*j* are both a second curved shape S2, but their sub-texture pattern units are different. The first texture pattern 1*i* includes a first unit 11*i*, and the second texture pattern 2*i* includes a second unit 21*i*. The second curve S2 is an arc, and the first texture pattern 1*i* and the second texture pattern 2*i* are alternately arranged in a column.

Figure 10:
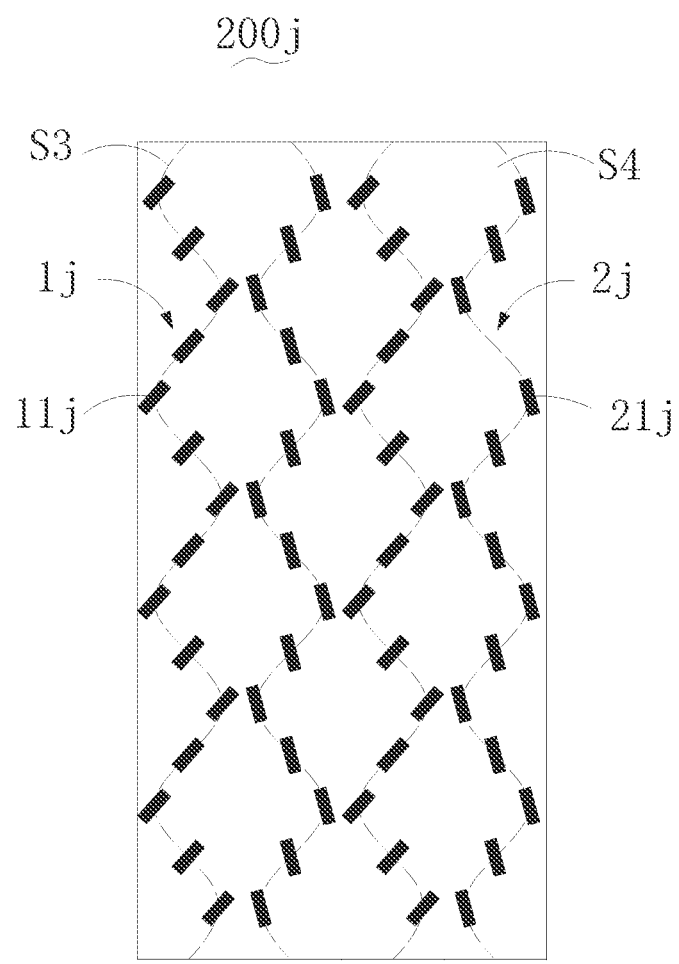
FIG. 10 is yet a further schematic diagram of the optical element of this disclosure.

Referring to FIG. 10, the optical element 200*j* includes two texture patterns: a first texture pattern 1*j* and a second texture pattern 2*j*. The first texture pattern 1*j* includes a sub-texture pattern unit: a first unit 11*j*. The first unit 11*j* is a plurality of small short lines arranged in accordance with a third curve S3 (which is predetermined and does not actually exist), and the small short lines are a linear cylindrical mirror. Central points of the small short lines of the first unit 11*j* are distributed along the third curve S3, and the small short lines are offset from the respective central points, and offset angles of the small short lines of the first unit 11*j* are identical, such as 60 degrees. The second texture pattern 2*j* includes a sub-texture pattern unit: a second unit 21*j*. The second unit 21*j* is a plurality of small short lines arranged in accordance with a fourth curve S4 (which is predetermined and does not actually exist), and the small short lines are a linear cylindrical mirror. Central points of the small short lines of the second unit 21*j* are distributed along the fourth curve S4, and the small short lines are offset from their respective central points, offset angles of the small short lines of the second unit 21*j* being identical, such as 100 degrees. The first texture pattern 1*j* includes a first unit 11*j* and is of a third curved shape S3, and the second texture pattern 2*j* includes a second unit 21*j* and is of a fourth curved shape S4. The third curve S3 is vertically disposed and in a wave form, and the fourth curve S4 is a mirror image of the third curve S3. The first texture pattern 1*j* and the second texture pattern 2*j* are alternately arranged in a column in a transverse direction.

Figure 11:
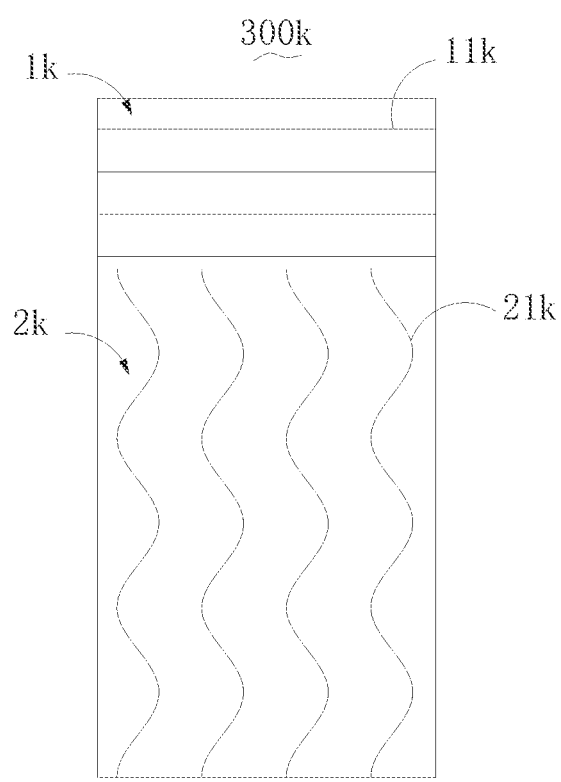
FIG. 11 is yet a further schematic diagram of the optical element of this disclosure.

Referring to FIG. 11, the optical element 300*k* includes two texture patterns: a first texture pattern 1*k* and a second texture pattern 2*k*. The first texture pattern 1*k* includes a sub-texture pattern unit: a first unit 11*k*. The first texture pattern 1*k* includes a first unit 11*k*, and the first unit 11*k* is a linear cylindrical mirror. The second texture pattern 2*k* includes a sub-texture pattern unit: a second unit 21*k*. The second unit 21*k* is a curved cylindrical lens. The second texture pattern 2*k* includes three second units 21*k* that are consecutively disposed. The first unit 11*k* extends transversely, and the first texture pattern 1*k* is disposed on an upper side of the optical element 300*k* (as illustrated in the figure) and arranged vertically. The second unit 21*k* extends vertically, and the second texture pattern 2*k* is disposed on a lower side of the optical element 300*k* and arranged transversely. In other embodiments, the first texture pattern extends obliquely, or the second texture pattern extends obliquely; or the first texture pattern is a curved cylindrical lens, and the second texture pattern is a linear cylindrical mirror, and the first texture pattern and the second texture pattern are arranged in columns respectively or alternately arranged in a column.

This application further discloses a mobile phone cover plate including the above optical element, preferably, such as a mobile phone back cover, thereby increasing appearance decoration of the mobile phone, and better adapting to the market development needs.

This application further discloses a mold for manufacturing the above optical element, the mold including plural texture patterns, at least one type of texture patterns of plural texture patterns having concave structures or convex structures, the at least one type of texture patterns containing at least one type of sub-texture pattern units, wherein the at least one type of texture patterns are of curved shapes.

For the above targets, features and advantages of the present invention to be understood more easily, embodiments of the present inventions are described above with reference to the accompanying drawings. In the above description, many details are given so that the present invention is fully understood. However, the present invention may be carried out in other implementations than those described above. Similar modifications may be made by those skilled in the art without departing from the concept of the present invention, hence, the present invention is not limited to the above disclosure. And the technical features of the above embodiments may be arbitrarily combined. For the sake of concise description, not all possible combinations of the technical features of the above embodiments are described. However, combinations of the technical features shall be deemed as being within the protection scope of the present invention only if the combinations of these technical features are not contradictory to each other.

The above embodiments are some implementations of the present invention only. Description of these implementations are relatively particular and minute, however, it they should not be understood as limiting the protection scope of the present invention. It should be noted that many variants and modifications may be made by those skilled in the art without departing from the concept of the present invention, and all of these are covered by the present invention. Hence, the protection scope of the present invention shall be covered by the attached claims.

What is claimed is:

1. An optical element for decoration, wherein the optical element comprises:
   plural texture patterns, at least one type of texture patterns of the plural texture patterns having concave structures or convex structures;
   the at least one type of texture patterns containing at least two types of sub-texture pattern units, wherein the at least two types of sub-texture patterns units are of curved shapes and disposed at intervals, and at least one parameter of amplitudes, curvatures, widths, angles, radians, widths, and lengths, of curves of the at least two types of sub-texture pattern units are different;
   wherein each sub-texture pattern unit is a curved cylindrical lens having a fixed shape, the curved cylindrical lens is of a sinusoidal curve, a cosine curve, or an irregular curve in its length direction, and the curved cylindrical lens comprises a front end point and a rear end point at both ends of a curve, a rear end of a curved cylindrical lens of two curved cylindrical lenses of neighboring two sub-texture pattern units being smoothly connected to a front end of the other curved cylindrical lens, said being smoothly connected refers to that curvatures of the two sub-texture pattern units at an intersection are identical.

2. The optical element for decoration according to claim 1, wherein each type of the texture patterns comprises two or more types of sub-texture pattern units, the two or more types of sub-texture pattern units being alternately, regularly, or randomly connected and disposed in each type of the texture patterns.

3. The optical element for decoration according to claim 1, wherein the optical element comprises two or more types of texture patterns disposed in a column, in the same column, the two or more types of texture patterns being alternately, regularly or randomly disposed.

4. The optical element for decoration according to claim 1, wherein the optical element comprises two or more types of texture patterns, the two or more types of texture patterns having at least one identical sub-texture pattern unit.

5. The optical element for decoration according to claim 1, wherein one of the texture patterns has two or more identical or different sub-texture pattern units, the two or more identical or different sub-texture pattern units being disposed consecutively.

6. A mobile phone cover plate, wherein the mobile phone cover plate comprises the optical element for decoration as claimed in claim 1.

* * * * *